United States Patent [19]

DeConti et al.

[11] Patent Number: 5,003,829
[45] Date of Patent: Apr. 2, 1991

[54] ENERGY ABSORBING DEVICE AND TORQUE MEASURING APPARATUS THEREFOR

[75] Inventors: John P. DeConti, 328 Maple St., New Britain, Conn. 06051; Raymond N. Quenneville, Suffield, Conn.

[73] Assignee: John P. DeConti, New Britain, Conn.

[21] Appl. No.: 415,086

[22] Filed: Sep. 29, 1989

[51] Int. Cl.[5] .................... G01L 3/16; F16D 65/853
[52] U.S. Cl. .............................. 73/862.12; 188/264 D
[58] Field of Search .................. 73/862.11, 862.12; 188/71.6, 264 D, 264 CC

[56] References Cited

U.S. PATENT DOCUMENTS

| | | |
|---|---|---|
| 2,976,083 | 3/1961 | Zink et al. |
| 2,982,377 | 5/1961 | Eames |
| 2,997,312 | 8/1961 | Muller et al. |
| 3,068,689 | 12/1962 | Warsaw |
| 3,453,874 | 7/1969 | Cline |
| 3,592,298 | 7/1971 | Leffert |
| 3,651,895 | 3/1972 | Whitfield |
| 3,826,129 | 7/1974 | Wiss |
| 3,902,360 | 9/1975 | Cline |
| 3,940,978 | 3/1976 | Akkerman et al. |
| 4,013,148 | 3/1977 | Kobelt |
| 4,092,855 | 6/1978 | Kinney |
| 4,217,775 | 8/1980 | Hikari |
| 4,412,455 | 11/1983 | Borgersen |

FOREIGN PATENT DOCUMENTS 653565  5/1951  United Kingdom

*Primary Examiner*—Charles A. Ruehl
*Attorney, Agent, or Firm*—Mattern, Ware, Stoltz & Fressola

[57] ABSTRACT

In a dynamometer, an internally cooled disc is utilized in a braking system which can apply a large amount of torque for an extended period of time. A hollowed braking disc comprising individual cooling cells is employed. Cooling liquid is injected into the center of the braking disc and, by centrifugal force, is forced into the cooling cells via a flow tube ring. The cooling liquid vaporizes in the cooling cells thus absorbing the heat generated. The vapor escapes the disc via vent holes. A unique torque measurement system is also utilized with its braking system. A resultant force, formed by the sum of individual forces upon braking pistons within the braking system, is measured utilizing a strain gauged load cell. The strain gauged load cell is strategically positioned to measure a resultant displacement of the braking caliper due to the applied torque.

66 Claims, 5 Drawing Sheets

FIG. 8
(PRIOR ART)
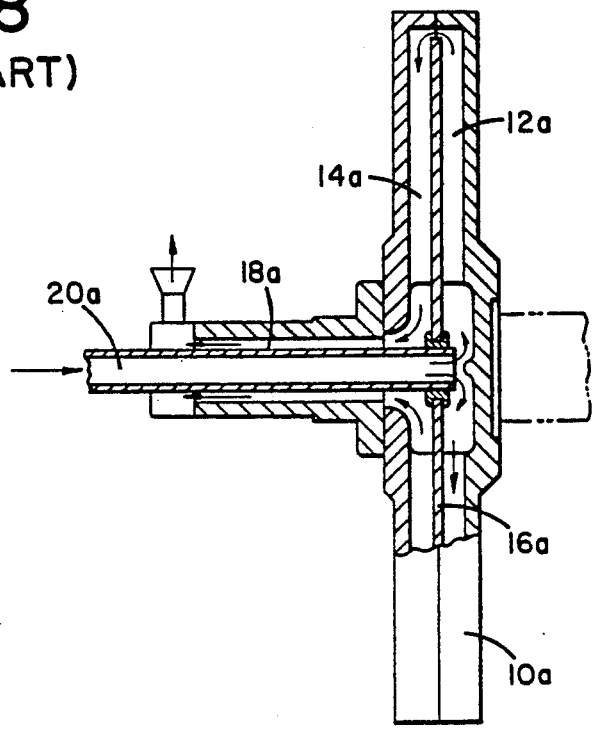
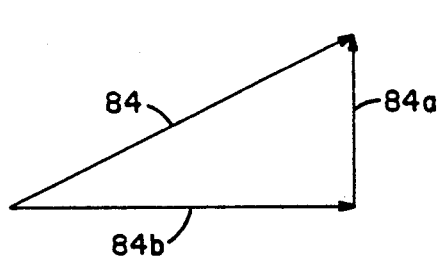
FIG. 7A
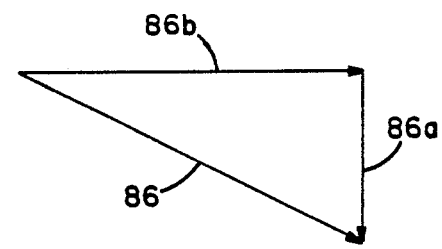
FIG. 7B
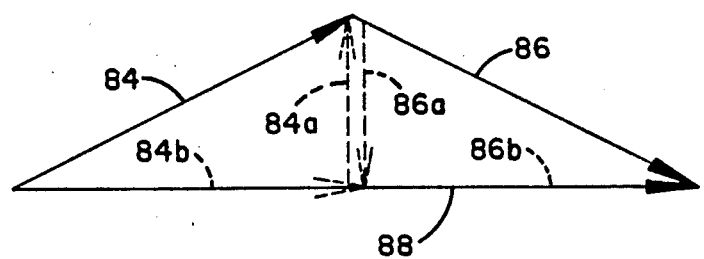
FIG. 7C

ENERGY ABSORBING DEVICE AND TORQUE MEASURING APPARATUS THEREFOR

BACKGROUND OF THE INVENTION

1. Field of the Invention

The present invention relates generally to an energy absorption system such as a dynamometer, which incorporates an internally liquid-cooled disc and an optional torque measuring apparatus.

2. Background of the Invention

Disc-braking systems have been used for many years to brake automobiles, aircraft, trucks, and other vehicles. Such braking systems are also used as dynamometers to absorb kinetic energy associated with systems that test power output from power plants, engines and the like. Disc brake systems are chosen over other braking means, such as drum brakes, for various reasons including braking effectiveness (anti-fading), cost, and serviceability.

Generally a disc brake system includes a rotating disc upon which a braking or retarding force is applied. A rotating shaft is connected to the disc, stationary brake pads are forced against the disc to effectuate the braking action, and calipers hold the brake pads in place. In operation, the calipers are normally hydraulically controlled; that is, hydraulic pressure forces the brake pads against the rotating disc. The kinetic energy of the rotating disc is transformed into heat via friction as the disc decelerates between the brake pads. Under normal conditions such as decelerating an automobile operating at a normal highway speed, the heat generated by the energy absorption process is dissipated from the disc and the brake pads to the surrounding air. However, during longer and harder periods of braking, such as braking a car or truck while traversing a long downhill slope found in mountainous terrain, the disc brake system may no longer be cooled at an adequate rate; thereby adversely affecting their braking capability. When such operating conditions are encountered, the brake pads and disc become excessively hot and rapidly become destroyed.

The brake shoe burn-out becomes especially apparent in conditions where there is a high energy transfer rate, such as the kinetic energy transfer associated with rapid braking of a racing car traveling at high speed. In such situations, the use of air to cool the disc brake system is generally insufficient to prevent excessive brake pad wear. Other more effective heat transfer methods have been utilized. One such method involves spraying a liquid, such as water, directly on the rotating disc as it is braking, thus allowing the heat to be transferred to the liquid. This method, though increasing the heat transfer rate, creates a braking hazard because the coefficient of friction between the disc and the pads will vary dramatically as a function of disc/pad temperature and the amount of liquid between the disc and the pad. Thus, an externally liquid-cooled disc brake system, though extending the disc and brake pad lives, can create unreasonable risks and cannot be effectively controlled.

Dynamometers are devices for absorbing and measuring energy output of power plants, engines, or other mechanical energy producing devices (MEPD). By definition, energy per unit of time represents the power generated by the device. Dynamometers are typically used in horsepower output measurement of engines used in racing cars, speed boats, motorcycles, and other high performance machines. Horsepower is simply a measure of power which by definition is equal to 550 foot pounds per second or 745.7 watts.

In operation, the MEPD can be directly connected via its crank shaft, or indirectly coupled, via its power transfer means (e.g. the associated vehicle's drive wheel), to the dynamometer. A retarding torque is applied to the MEPD by the dynamometer. The MEPD's output torque can thus be measured at a given angular speed allowing a horsepower rating to be calculated. The dynamometer must be capable of applying sufficient reactive torque while effectively dissipating the absorbed energy through heat transfer so as to maintain the dynamometer within a safe operating temperature.

Various methods of power absorption have been utilized in dynamometers. A dynamometer employing a disc brake system using air cooled pads and discs has restricted power absorption capability due to heat transfer limits of the air contacting the pads and discs. Such dynamometers are therefore restricted to testing MEPD's of low horsepower capability, with such testing generally limited to short periods of time.

Liquid dynamometers are dynamometers applying reactive torque by means of an impeller in a bath of liquid. Such dynamometers have beer used with some success. Here the energy absorption is achieved by heating the liquid through turbulence and either subsequently cooling the liquid in a closed loop system, or using new liquid in an open loop system. Such dynamometers require large amounts of liquid and therefore are not readily portable. Furthermore, because the liquid dynamometer's resistive torque is generally varied by changing the water pressure within the device, it is not easy to change the opposing torque so as to allow testing of different horsepower MEPD's. Finally, a liquid dynamometer is generally expensive to fabricate.

Externally liquid-cooled disc brakes which spray liquid onto the disc to dissipate heat are not particularly suitable for dynamometers since such cooling is generally not uniform, therefore making accurate torque measurement difficult.

Some internally liquid-cooled disc brake systems have been developed to overcome these difficulties. In operation, a liquid is injected into the disc having an internal cavity. The heat generated by the brake is transferred to the liquid, and the liquid, now at a higher temperature, is forced out of the disc. In some instances the amount of energy absorbed by the braking system is large enough to vaporize the liquid, resulting in exiting hot gas (typically steam). The latent heat of vaporization results iun substantially high energy absorption, thereby providing a dynamometer with a higher energy absorption capacity at a given operating temperature than if vaporization did not occur.

Various designs for internal liquid cooling are shown in prior art devices. Eames, U.S. Pat. No. 2,982,377, liquid passing through condutis in the drum as a means of transferring the heat from the friction element. The cooling system is closed loop with the liquid cycled through vehicle's radiator for heat transfer. A pump is used to propel the liquid through the system. Unlike the present invention, the liquid cooled brake of Eames is utilized in a drum rather than a disc and does not use or suggest flow tubes to prevent vapor lock.

Muller, et al., U.S. Pat. No. 2,997,312 discloses an internally liquid cooled disc brake system for use in an automobile. This system, like Eames, is a closed system in the preferred embodiment. Muller et al. uses a forced cooling liquid as a means of heat transfer from the braking disc. The liquid is forced via conduits through the braking discs, which have hallowed passages, or cooling jackets. The cooling liquid is returned to the automobile's radiator for heat transfer. Muller, et al. does not use or suggest cooling cells or flow tubes as disclosed by the present invention in order to maximize cooling capacity and minimize risk of vapor lock.

Dunlop et al., British Patent No. 653,565, employs a sinuous passage in a cast disc to route cooling water through the braking disc to remove the frictional heat of the disc caused by the brake pads. The water is forced through the maze-like configuration where it is vaporized, utilizing the latent heat of vaporization of the water/steam to absorb the disc's heat.

In Kobelt, U.S. Pat. No. 4,013,148, a disc with zigzag cooling passages is disclosed as a means for keeping the brake system cool and thus retarding the wear of the brake pads. Neither Dunlop et al. or Kobelt illustrate or suggest in a liquid cooled disc the radially extending cooling cells and flow tubes to effectuate a continuous flow of cooling water while utilizing the latent heat of vaporization for maximal cooling of the present invention.

FIG. 8 shows a prior art device in Hikari, U.S. Pat. No. 4,217,775. As seen in FIG. 8 a disc with first and second internal compartments 12a, 14a, is separated by a partition 16a which extends radially through the disc 10a for cooling water to pass through. The water is fed into a supply duct 18a in the center of the disc 10a, where, by centrifugal force, and supply pressure the water is forced to the perimeter of the disc via the first compartment 12a where it is heated. The direction of water flow is indicated by the arrows shown. It is then discharged from the disc via the second compartment 14a and discharge duct 20a. Hikari, while showing the use of radially displaced cooling water internal to the disc for removing heat therefrom, does not teach or suggest the use of flow tubes and cooling cells to disperse cooling water internal to the disc as the present invention does.

Because a system such as a dynamometer is required to absorb large amounts of energy for an extended period of time, it is imperative that such a system employ an effective energy absorbing means. In a liquid-cooled system, the maximum heat transfer for a given change in temperature occurs at vaporization, a condition which is called latent heat of vaporization. Thus, internally liquid-cooled systems which operate at vaporization are generally most effective.

Although maximum heat transfer occurs at vaporization, other conditions result which can cause problems for internally liquid-cooled systems. More specifically, the liquid vaporization, if not allowed to expand generates a large amount of pressure which can block the entry of incoming liquid. If the cooling liquid is blocked, the vaporizated liquid will superheat thereby disabling the power absorbing means.

Furthermore, the vapor/liquid mix must exit the disc in such a way as to allow the disc's outer surfaces to remain dry. If the outer surfaces do not remain dry, the coefficient of friction between the outer surfaces and the braking pads will vary, resulting in non-uniform resistive force. Such non-uniform force is undesirable in a dynamometer.

Besides providing a power absorption means, a dynamometer must be able to determine the MEPD's output torque at a given angular velocity. Angular velocity can be measured in many straight forward ways. Output torque, on the other hand, is somewhat more complicated to measure accurately.

Akkerman et al., U.S. Pat. No. 3,940,978 discloses a water dynamometer which, through a measurement of the water pressure required as an opposing force, indicates the corresponding horsepower.

Hikari. U.S. Pat. No. 4,217,775 shows a load testing apparatus utilizing liquid-cooled disc brakes as a power absorbing means, as described above. Hikari employs a detector which is compressed by pressers to measure the output torque of the test engine. Inherent inaccuracies may exist in these measurement techniques.

The present invention is designed to overcome the limitations that are attendant to traditional dynamometers, and toward this end, it contemplates the provision of a dynamometer which can accurately test an MEPD with a high horsepower rating for an extended period of time.

Neither Akkerman nor Hikari teach or suggest the present invention's strategic placement of a sensing device along a resultant force which is a direct measure of the opposing torque.

SUMMARY OF THE INVENTION

The present invention is designed to overcome the limitations that are attendant upon the use of traditional dynamometers. It incorporates an internally liquid cooled disc braking system which can apply a large reactive torque to a rotating shaft for an extended period of time. This is accomplished by employing a hollowed braking disc comprising a plurality of cooling cells. Cooling liquid flows into the center of the braking disc and, by centrifugal force, is forced into the cooling cells via a flow tube ring assembly. Once in the cooling cells, the cooling liquid contacts the inner walls of the cells so as to rapidly absorb heat therefrom. The liquid is able to vaporize if the cell walls are at an elevated temperature, thereby greatly increasing the heat transfer capabilities of the disc due to the latent heat of vaporization. The liquid/vapor then escapes from the cells via vent holes.

The present invention circumvents the problem of vapor lock through use of the flow tube ring, which is sandwiched between two disc halves forming the disc. The flow tube ring routes the cooling liquid to the disc's radial extremity before the vaporization can occur. The centripetal force on the liquid in the chamber forces the liquid/vapor combination out of the vent holes thus, preventing vapor lock.

The present invention also incorporates a unique torque measurement system for use with its disc braking system. The disc braking system incorporates a caliper, two braking pads, and two pairs of braking pistons. As force is applied to the pistons, the pads are forced against the spinning disc. A resultant force, formed by the sum of individual piston forces, is measured using a strain gauged load cell. The strain gauged load cell is strategically positioned to only measure a resultant displacement of the braking caliper due to the applied torque.

A specific embodiment of the present invention includes a dynamometer which can accurately test MEPD's for extended periods of time through use of the abovementioned disc braking system. It is therefore a principal object of the present invention to provide a dynamometer which employs an internally liquid cooled disc braking system which can apply a large opposing torque for an indefinite period of time to an angularly rotating machine while dissipating the resulting heat generated.

It is also an object of the present invention to provide a dynamometer of the above description which employs an accurate torque measurement system.

It is a further object of the present invention to provide a dynamometer which is relatively lightweight compared to other dynamometers having comparable energy absorption capability.

Another object of the present invention is to provide an internally liquid cooled braking system that is not subject to vapor lock and thus can transfer large amounts of friction-induced heat from the associated braking disc.

Other objects of the present invention will in part be obvious and will in part appear hereinafter.

BRIEF DESCRIPTION OF THE DRAWINGS

For a fuller understanding of the nature and objects of the present invention, reference should be made to the following detailed description taken in connection with the accompanying drawings, in which:

FIGS. 7A, 7B and 7C are vector diagrams illustrating the vector addition of the resultant force associated with the torque measuring apparatus of the present invention; and FIG. 8 is a partial cross-sectional view of a prior art water-cooled disc assembly.

BEST MODE FOR CARRYING OUT THE INVENTION

Figure 1:
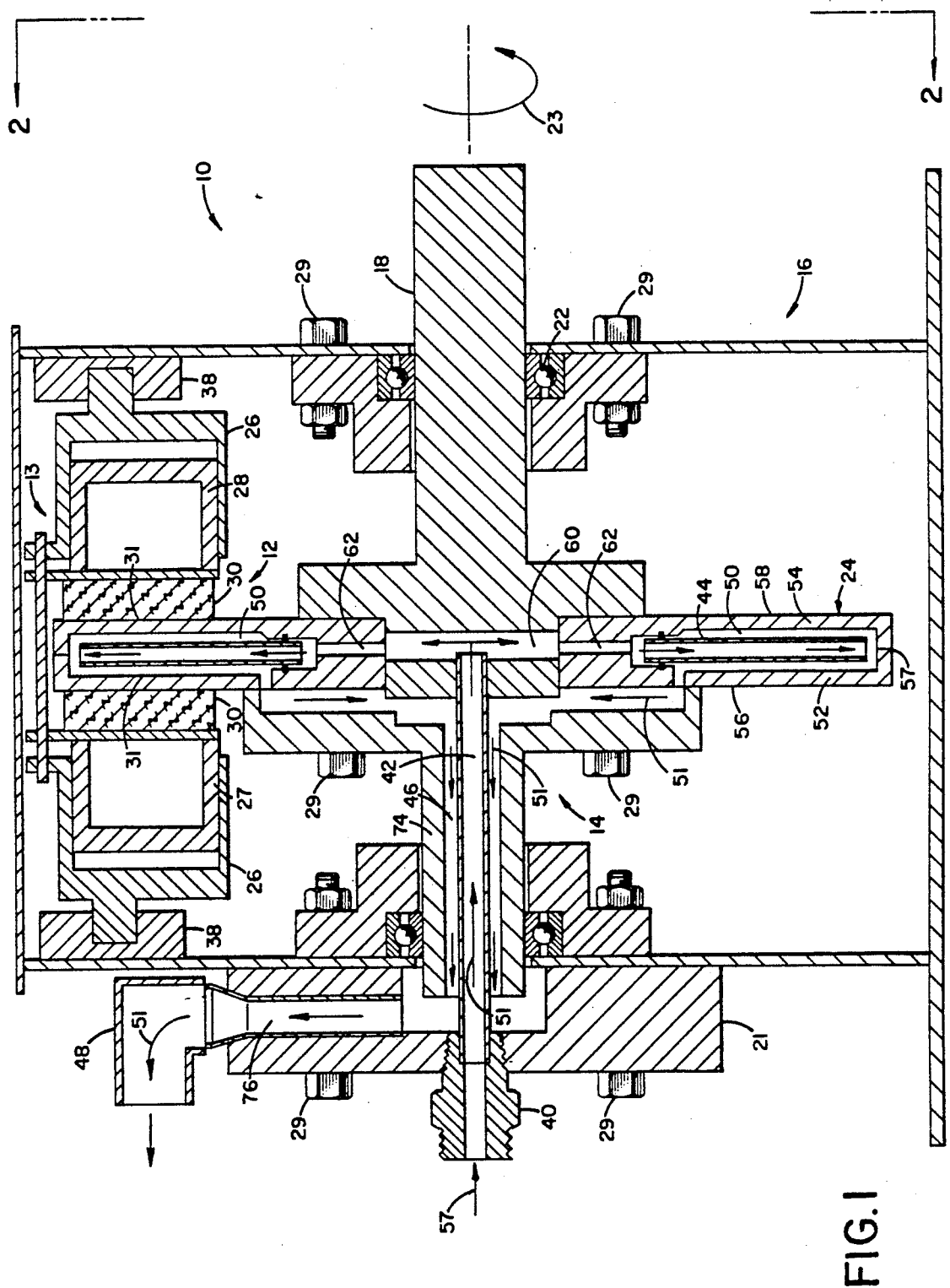
FIG. 1 is a cross-sectional view of the energy absorbing device of the present invention taken along line 1—1 of FIG. 2 but not including the torque measurement apparatus associated therewith.

As best seen in FIG. 1, an energy absorbing device 10 is particularly suited for applying a restraining torque to a rotating shaft 18 so as to convert the kinetic energy of rotation produced by an engine or other type of mechanical energy producing device (MEPD) into heat and then to remove this heat via liquid/vapor cooling. The energy absorbing device may be used to effect braking of the associated rotating shaft or it may be used to apply a desired reactive torque at a given shaft angular velocity so as to act as a dynamometer. When used as a dynamometer, the associated MEPD (not shown) can be directly or indirectly coupled to the energy absorbing device 10 via shaft 18. The coupled MEPD's mechanical power output can then be measured by a torque measuring apparatus 13 (see FIG. 2) via Equation (1)

$$\text{Power} = \text{Torque} \times (\text{Angular Velocity}) \quad (1)$$

Since power is by definition equal to energy per unit of time, the energy absorbed is equal to the time integral of the absorbed power, or:

$$\text{Energy} = \int \text{Power } dt = \text{Torque} \times (\text{Angular Velocity}) \, dt \quad (2)$$

For constant torque and constant angular velocity equation (2) become:

$$\text{Energy} = \text{Torque} \times (\text{Angular Velocity}) \times \text{Time}. \quad (3)$$

The unit of measure for power in the English system is the "horsepower", where one horsepower is by definition equal to 550 foot pounds per second. One horsepower is equivalent to 745.7 watts.

When used as a dynamometer, the energy absorbing device comprises: (1) a braking system 12 for applying opposing torque to the MEPD's output; (2) a torque measurement apparatus 13 to measure the braking system's applied torque; (3) a cooling system 14 for removing heat generated by the braking system 12; and (4) a skeletal system 16 for mounting the braking system and the torque measurement apparatus 13. Each of these items is discussed in greater detail below.

In operation, the MEPD mechanical output is coupled to the energy absorbing device 10 via skeletal system 16. The skeletal system 16 is comprised of a housing 20, a brake shaft 18, an end cap 21, four guides 38 (two are shown in FIG. 1), and two sets of bearings 22. The housing 20, made of sheet metal or a similar material, provides a casing for the power absorber 10. The brake shaft 18, which partially extends out of the housing 20, transfers the MEPD's output rotational power to the braking system 12. The engine's output rotational direction is illustrated by arrow 23. The guides 38 position the disc brake assembly within the housing 20 while allowing the assembly to move slightly. This movement is measured by the torque measurement system 13. The bearings 22 allow a power transfer from the brake shaft 18 to the brake system 12 with minimal power loss. Finally, end cap 21 provides an access to the energy absorbing device 10 for the cooling water. Both end cap 21 and brake shaft 18 are preferably made from a mild steel.

Brake system 12 is a disc brake type system similar to those heretofore used in automobiles, motorcycles, and the like. The system 12 consists of a brake disc 24, a caliper 26, a first and a second piston pair 27, 28, and two pads 30. The brake disc 24 is directly coupled to the brake shaft 18 of the skeletal system 16 via mounting hardware 29, which, in turn, is either directly or indirectly coupled to the test engine or other MEPD. The brake system absorbs the output rotational power of the test engine.

Caliper 26, piston pairs 27, 28, and pads 30 operate as a single unit to provide a braking force to the disc 24. Pads 30, which are composed of a friction material, sandwich brake disc 24 along an outer peripheral portion of the brake disc's flat surfaces, or braking faces 31. The friction material is preferably non-abrasive, non-ferrous, and non-asbestos in composition. One such material is manufactured by Fox Friction Mfg., Inc., 5195 Timbrelea Blvd., Mississauga, Ontario, Canada L4W2S3 which contains brass fiber sold under Fox Friction, composition number 1.1 GG. The disc material is preferably fabricated from grey iron, having a tensile strength of between 30,000 and 35,000 pounds per square inch (PSI) and further comprising free graphite in its microstructure so as to exhibit an anti-galling property.

The two piston pairs 27, 28 lie adjacent to pads 30 with one of each pair on either side of disc 24. Pads 30 and piston pairs 27 and 28 are held in place by caliper 26, which straddles disc 24. Varying pressure, normally hydraulically controlled, can be applied to caliper 26 to force piston pairs 27, 28 against pads 30. Pads 30, in turn, are forced against disc 24, which causes a braking action on rotating disc 24. It should be noted, however, that other methods of retarding the motion of a rotating disc can be utilized that do not employ frictional contact as a means of braking the disc.

Figure 2:
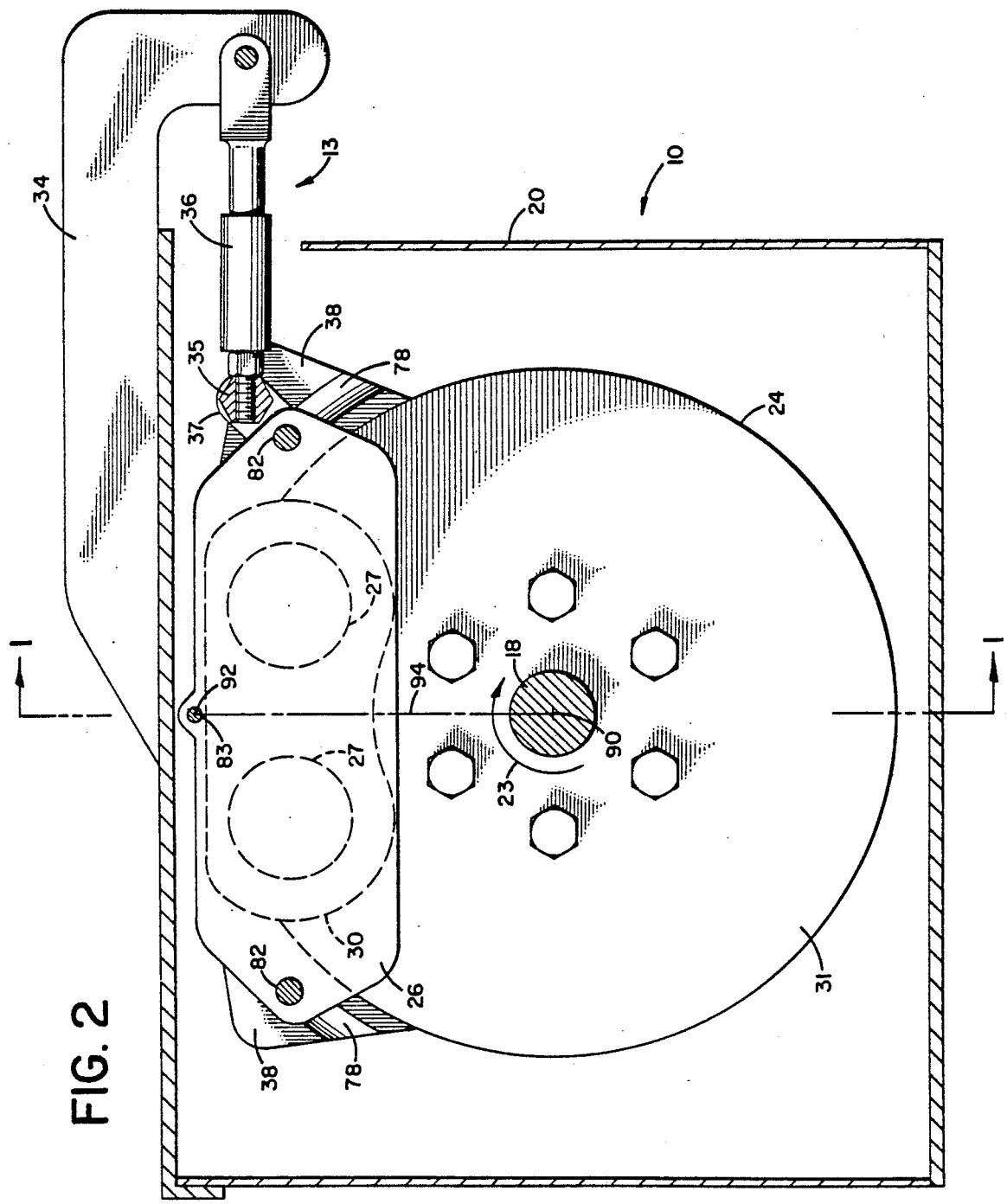
FIG. 2 is a partial cross-sectional view of the energy absorbing device and torque measuring apparatus taken along line 2—2 of FIG. 1.

As shown in FIG. 2, the torque measurement system 13 comprises an anchor 34, a coupling bar 35, a strain gauge 36, and coupling arms 37. Coupling bar 35 and coupling arms 37 act upon strain gauge 36 with a force proportional to the applied torque. Gauge 36 is held in place by anchor 34 as discussed in greater detail.

Referring again to FIG. 1, the cooling system 14 for energy absorbing device 10 comprises a cooling water inlet fitting 40, a supply duct 42, a flow tube ring 44, a discharge duct 46, an outlet cap 48, as well as the braking disc 24. Each of these elements are interconnected to form a type of internal plumbing system for the energy absorbing device.

In operation, cooling liquid flows into system 14 through the interconnecting tubing and ducts so as to flow into hollowed sections of the braking disc 24, identified as cooling cells 50. The cooling cells 50 are located adjacent to and between the two braking faces 31 of the disc 24. This area of the disc 24 naturally becomes the hottest area while the energy absorption device is in operation. The heat generated by the braking system 12 causes heating and partial vaporization of the liquid in the cells 50. The vapor/liquid mix is forced out of the disc 24 by additional cooling liquid and exits the energy absorber 10. The cooling liquid or vapor/liquid mix flow is indicated by the arrow 51 within the cooling system 14. The cooling system 14 is discussed in greater detail below.

These four subsystems function in unison to provide a high energy absorbing device which can operate without excessive brake system wear. Additionally, they provide unique and accurate torque measurements for the purpose of horsepower calculation. These results can be accomplished in a dynamometer while allowing the dynamometer to remain portable and economical.

For a better understanding of the energy absorbing device 10, the cooling and torque measurement systems are described in greater detail below.

Cooling System

As previously discussed, the cooling system 14 is a system of tubes and fittings through which cooling liquid is piped throughout the energy absorbing device 10. The cooling liquid absorbs the heat generated in the energy absorbing device by becoming warmer and by vaporization. The vapor is immediately displaced by additional cooling liquid thus removing most of the heat generated by the energy absorbing device.

FIG. 1 shows the cooling system in detail. Cooling liquid is first piped into inlet fitting. The cooling liquid used in the preferred embodiment is water and will be used to describe the system. Other coolants may be used, such as automobile coolant containing water and ethyl glycol as would be used in a closed system as discussed previously. A supply duct 42, which lies along the central axis of braking disc 24, carries the water to disc 24. The supply duct 42, which is preferably fabricated from brass, is housed in a flow shaft 74. The flow shaft 74 is preferably made of a mild steel.

Figure 3:
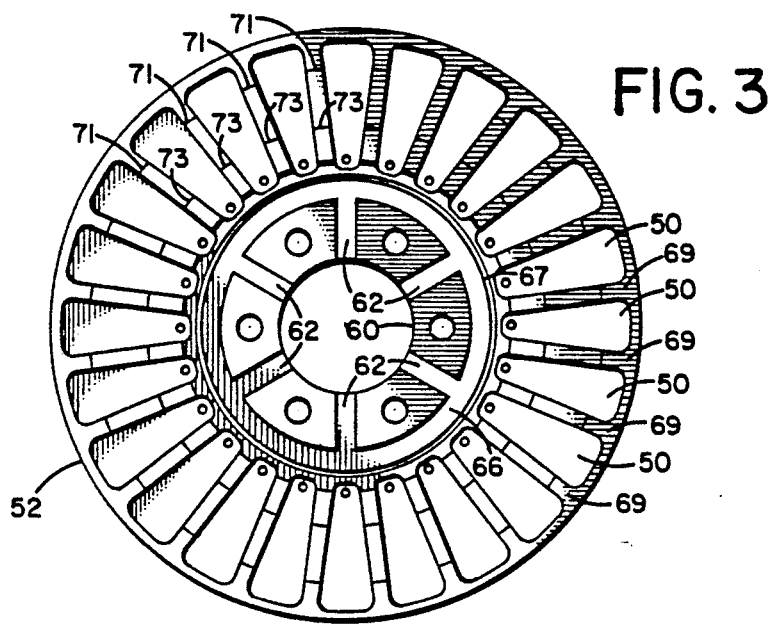
FIG. 3 is a top view of one disc half of the present invention's disc assembly.
Figure 4:
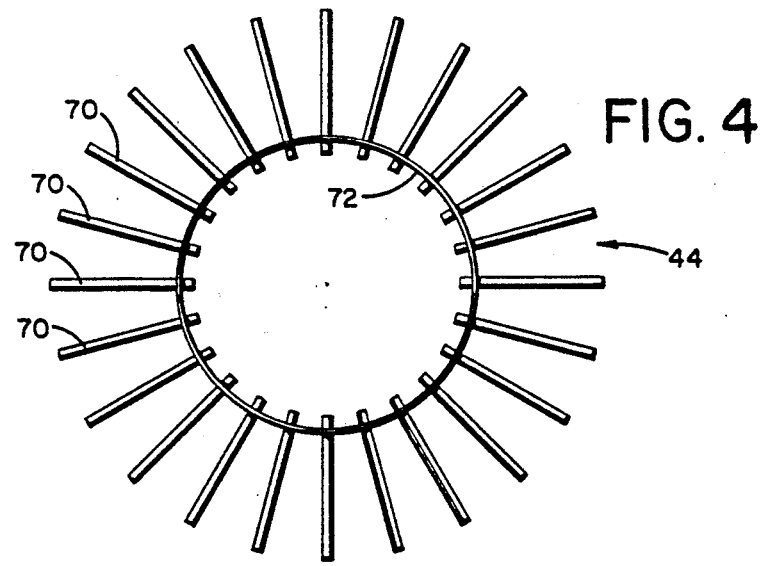
FIG. 4 is a top view of the flow tube ring forming part of the disc assembly.
Figure 5:
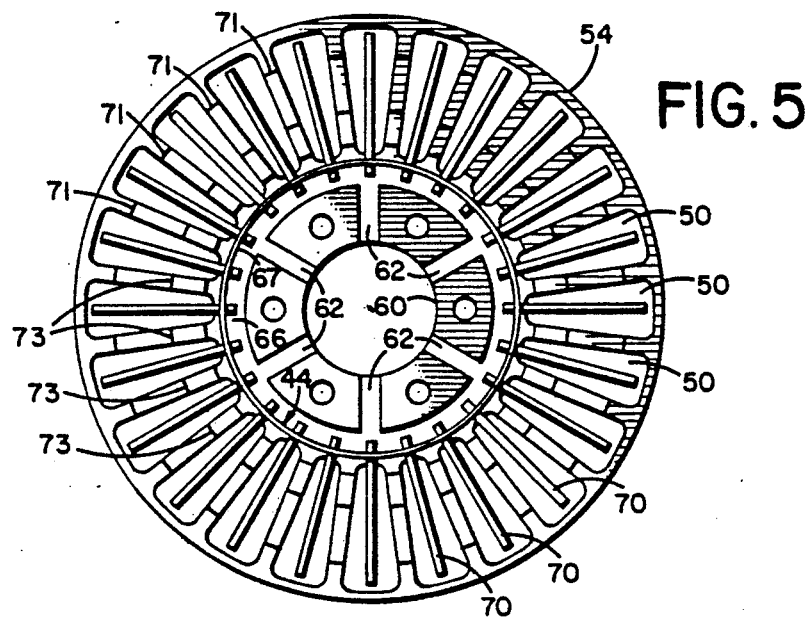
FIG. 5 is a top view of the flow tube ring positioned within another disc half of the present invention.

FIGS. 3 through 5 illustrate the elements of the braking disc assembly 24. A first section or half 52 of the braking disc 24 is shown in FIG. 3, while its mating half 54 is depicted in FIG. 5. The two braking disc sections 52, 54 are substantially mirror images of one another with a single exception which will be discussed in greater detail below. FIG. 4 illustrates the flow tube ring 44 as briefly mentioned previously.

The braking disc 24 is assembled by sandwiching the flow tube ring 44 between the first and second sections 52, 54. The perimeter is then welded along junction 57 of the two sections 52, 54 (See FIG. 1) thus holding the assembly together.

Referring again to FIG. 1, the first and second braking disc sections 52, 54 are circular with a flat surface 56, 58 upon which the braking force is applied. Referring to FIGS. 3 and 5, the first and second disc sections 52, 54 are shown in a top elevational view with the flat surfaces 56, 58 on the bottom. Sections 52, 54 are made from a cast mold and are preferably fabricated from iron. The disc sections 52, 54 have cylindrical bores through their centers which, when assembled, make up a centrifuge chamber 60 for the brake disc 24 as shown in FIG. 1. It is in the centrifuge chamber 60 where the centrifugal force first acts upon the cooling water.

Each disc half 52, 54 is formed to comprise a number of channels and chambers to route the cooling water within the disc 24 as to allow the vaporization of the cooling water. Each disc half 52, 54 comprises six centrifuge channels 62, a dispersion channel 66, and twenty-four cooling cells 50.

Referring again to FIGS. 3 and 5, the six centrifuge channels 62 are shown extending radially from the centrifuge chamber 60 in each disc section 52, 54. The channels 62 are equidistantly spaced about the chamber 60, similar to spokes in a wheel, and form passages for the cooling water to reach the outer perimeter of the hollowed braking disc 24. The channels 62 extend to the dispersion channel 66 which circumscribes the outer ends of the centrifuge channels 62. The twenty-four cooling cells 50, which are cup-like pockets, are situated radially outward from the dispersion channel 66. The cells 50 are displaced equidistantly about the disc halves 52, 54. The dispersion channel 66 provides a conduit for which the cooling water can disperse amongst the cooling cells 50. A ring groove 67 is situated approximately in the center of the channel 66. The ring groove 67 is sized for receipt of retaining ring 72 of flow tube ring 44.

The cooling cells 50 are displaced radially about the dispersion channel 66 and are situated in the area of the braking disc 24 which becomes hottest during the braking action (i.e., directly adjacent to the braking faces 31). Each cooling cell 50 is separated from one another by a separating wall, or rib 69. Each rib 69 comprises first and second pressure stabilizing notches 71, 73.

Ribs 69 serve as a structural support for the disc 24 in order to counteract the force applied by braking pads 30 against braking faces 31. Because ribs 69 of the first disc half 52 lie flush with the corresponding ribs 69 of the second disc half 54, the ribs 69 prevent the disc 24 from collapsing from the force applied by the braking pads 30.

Second, the ribs 69 serve to conduct the heat generated by the braking force from the disc's outer flat surfaces 56, 58 to the cooling cells 50 where the heat can be transferred to the cooling water. The ribs 69 further provide additional surface area within each cooling cell 50 to facilitate maximum heat transfer. The first and second stabilizing notches 71, 73 are inscribed in each rib 69. The first notch is positioned towards the radially outer end of each rib 69 and the second notch is positioned towards the radially inner end of each rib. Stabilizing notches 71, 73 act to equalize any differences in pressure occurring between two adjacent cells 50 and to pass liquid and/or vapor therebetween if for some reason one of the cells is not receiving an adequate flow of cooling liquid.

Each cooling cells 50 further comprises a vent hole 68, which is situated at the radially innermost portion of each cell 50. The vent holes 68 extend from the first flat surface 56 axially inward to the cooling cell 50. There are no holes 68 in the second flat surface 54 of the brake disc 24. Holes 68 provide an outlet for the vapor/water mixture to escape and thus allow a continuous flow through the hollow disc 24. Each vent hole 68 is cylindrical in shape and extends through first disc half 52. The vent hole's cross-sectional area may be varied from disc to disc but must be large enough to allow continuous water/vapor flow without inducing appreciable back pressure within the cell 50.

Referring now to FIG. 4, therein is illustrated a flow tube ring, indicated generally by the numeral 44. The flow tube ring 44 is comprised of twenty-four flow tubes 70 and a retaining ring 72. The flow tube ring 44 is preferably fabricated from stainless steel. The retaining ring 72 has a radius and height sufficient to fit inside the ring groove 67 of the dispersion channel 66 when the braking disc 24 is assembled. Extending radially outwardly from the ring 72 are the twenty-four flow tubes 70. The tubes are equally displaced about the ring such that when the flow tube ring 44 is placed inside the dispersion channel 66, each tube 70 sits approximately through the center of one cooling cell 50. Referring to FIG. 5, a flow tube ring 44 is shown seated within the ring groove 67 of the second disc half 54. The flow tubes have a length such that a small section of the tube is located inside of the retaining ring perimeter and the opposite end of the tube 70 sits within its associated cooling cell 50 in a radially outermost portion of the cell 50. Although the cross-sectioned size of the flow tubes may be varied, the flow tubes 70 must be large enough so that they are capable of supplying sufficient cooling water to the cooling cells during operation.

The dimensions of the braking system elements for an energy absorbing device capable of absorbing 200 horsepower (150 kilowatts) with a water flow rate of four gallons per minute (15.14 liters/minute) at 50° F. (10° C.) is presented in Table 1.

TABLE 1

| disc | |
|---|---|
| diameter | 11" (27.94 cm) |
| thickness | 1" (2.54 cm) |
| wall thickness | 3/16" (0.48 cm) |
| cooling cells | |
| wall height | ⅝" (1.59 cm) |
| flow tubes | |
| inner diameter | ⅛" (0.32 cm) |
| length | 2⅞" (7.30 cm) |
| vent holes | |

TABLE 1-continued

| diameter | 1/5" (0.51 cm) |
|---|---|

In operation, the braking disc 24 works as follows;

Referring to FIG. 1, as disc 24 spins due to an MEPD's output rotation 23, the braking pads 30 act upon the flat surfaces 56, 58 as described above. The frictional force between the pads 30 and the braking faces 31 generates heat: proportional to the energy dissipated. Though some of the heat is dissipated to the surrounding air, most of the heat is transferred to the outer surfaces 56, 58 of the disc 24 because of its inherent heat conductive properties. The frictional material of the pads 30 insulates this heat from the piston pairs 27, 28 and the caliper 26.

As previously described, the frictional material of the braking pads 30 wears rapidly when operated at high temperatures (typically in excess of 1400° Fahrenheit, 760 Celsius). Thus, to prevent rapid wear of the pads 30, the heat must be dissipated from the disc 24. This is most effectively accomplished utilizing the aforementioned internal liquid cooling method.

As shown in FIG. 1, the cooling water is routed to the centrifuge chamber 60 of the disc 24 via the supply duct 42, as previously mentioned. The spinning disc 24 acts as a centrifuge and forces the cooling water in a radial direction away from the center of the disc 24 and out of the centrifuge chamber 60. This effect forces the cooling water to enter into the centrifuge channels 62 around the chamber 60. The centrifugal force continues to act upon the cooling water and forces it into the dispersion channel 66. The water is displaced about the channel 66 and is forced through the flow tubes 70 into the cooling cells 50.

At this point, the cooling water has absorbed some heat because it has had direct surface-to-surface contact with the inner wall of the braking disc 24. Most of the heat transfer, however, will occur in the cooling cells 50, which are located adjacent to the braking faces 31.

Once in the cooling cells 50, the cooling water contacts the hot disc 24. The heat generated by the spinning disc/brake system causes the cooling water to rise in temperature. If the water temperature rises to the liquid/vapor transition temperature (100 degrees Celsius at atmospheric pressure), then any additional energy absorbed will result in vaporization of some or all of the water. The amount of energy necessary to transform the water from its liquid to vapor state is known as the heat of vaporization. For water at atmospheric pressure, this energy is equal to 539 calories per gram of water, or 1,663.9 foot-pounds per gram, or 754,742 foot pounds per pound of water. This amount of energy absorption occurs with no change in water temperature. In comparison, increasing one pound of water by one degree Fahrenheit (1.8 degrees Celsius) only results in 252.0 calories or 777.9 foot-pounds of energy absorption. It is therefore apparent that use of the liquid/vapor change of state is highly desirable in an energy absorption device that is to be operated at the lowest possible temperature. The vaporization causes the greatest heat transfer (i.e., latent heat of vaporization).

The centrifugal force continues to act upon the incoming cooling water in the centrifuge chamber 60. The cooling water is continually forced into the cooling cells 50 via the centrifugal force, thus forcing the vapor/water mix which is already in the cooling cells 50 in an award direction towards the disc's center. The vaporized water is less dense than the cooling water as the cooling water first enters the cooling cell 50, and, in a centrifuge, less dense objects are forced toward the center as the denser objects move toward the perimeter of the centrifuge. Furthermore, because the cooling water is piped to each cooling cell 50 via a flow tube 70, the water does not contact the hot disc 24 and the vapor/water mix until it has reached the cooling cell 50 near the disc's perimeter before vaporization; thereby reaches the disc's perimeter before vaporization; thereby preventing a vapor lock.

A vapor lock condition could occur if flow tubes are not used, such as in prior art devices. If the flow tubes are not used, the disc 24 could vapor lock in the following manner. As the disc 24 spins, the disc 24 is heated as the cooling water is forced into the cooling cells 70 directly from the centrifuge channels 62. As the heat is transferred to the cooling water, the water begins to increase in temperature and thus expand until vaporization. The cooling water is continually forced outwardly from the centrifuge channels 62 thus trapping the vapor against the disc's perimeter. As the two opposing forces (the centrifugal force acting upon the water and the centripetal force acting upon the steam) become equal, a locking condition occurs. The vapor is locked in the radially outermost portion of each cooling cell directly adjacent to the braking faces 31 where the heat transfer is the greatest. The only way the vapor can escape the inside of the disc is via the vent holes 68, which are located in a radially inner-most section of each cooling cell 50. But each vent hole 68 is blocked by the force of the cooling water. As more cooling water vaporizes, the pressure within the cooling hollow 64 continues to rise as no vapor can escape. The flow of cooling water will continue to flow within the disc 24 until the vapor pressure inside the cooling cells 50 is greater than the combination of the centrifugal force and the incoming water pressure. When such a pressure is reached the water flow stops and the vapor will superheat making disc 24 and thus pads 30 hotter; thereby rendering the cooling system ineffective.

Because the braking disc 24 of the present invention is configured with a unique flow tube design, a vapor lock condition cannot occur under normal operating conditions. The cooling water is routed directly to the perimeter of the disc 24 and begins the heat transfer. As the water vaporizes, it is forced toward the center of the disc 24 and the vent hole 68. The water/vapor mixture is forced through the vent hole 68 into the discharge duct 46 of the flow shaft 74. The vapor mix exits the power absorber 10 through a discharge tube 76 and outlet cap 48 in the end cap 21.

Furthermore, the cooling water is discharged in a way such that the outer surfaces 56, 58 of the brake disc 24 remain dry. The water/vapor mix is discharged through the outlet cap 48, which, as can be seen in FIG. 1, is located external to the housing 20. Thus, when the vapor condenses, it is external to the power absorber 10, thus allowing the braking system 12 to remain dry.

The Torque Measurement System

As was previously discussed, the torque measurement system 13 provides a dynamometer with an accurate measurement of the torque applied by the energy absorbing device 10. This measurement, coupled with an RPM measurement, allows a calculation of the MEPD's power at a given angular velocity.

Referring now to FIG. 2, the torque measurement system 13 is shown in detail. The torque measurement system 13 comprises an anchor 34 attached to the power absorber housing 20, a strain gauged load cell 36 connected to the anchor 34, a coupling bar 35 into which the load cell is screwed and coupling arms 37 which are coupled to the braking system 12 and act upon the load cell 36.

In operation, the MEPD's rotational output 23 is coupled to the brake shaft 18. This causes the disc 24 to spin. Thus, in an ideal situation, all of the test engine's output force is transferred to the rotating disc 24 as a rotational force. An opposing torque is applied in the manner previously discussed.

As the opposing torque is applied by the two piston pairs 27, 28 to the spinning disc 24, an equal and opposite force is applied to the brake system 12, which ultimately is coupled to the braking system caliper 26. The caliper 26, which is comprised of two caliper halves 26, is held together by first and second retaining pins 80, 82 and a center pin 83. The caliper 26 is positioned within the housing 20 by four guides 38, two on either side (two guides 38 are shown in FIG. 2). The guides 38, which are attached to the housing 20, comprise an accurate groove 78. The caliper 76 is positioned at the outer perimeter of the disc 24 within the guide grooves 78 with first and second pins 80, 82. Thus the caliper 26 is allowed to move slightly within the housing 20 along the guide grooves 78. Slight movement will occur when an opposing force is applied by the braking system 12.

A line drawn through the center point 90 of the brake shaft 18 and the center point 92 of the center pin 83 is designated as the center line 94. The piston pairs 27, 28 and brake pads 30 are positioned symmetrically about the center line 94.

Figure 6:
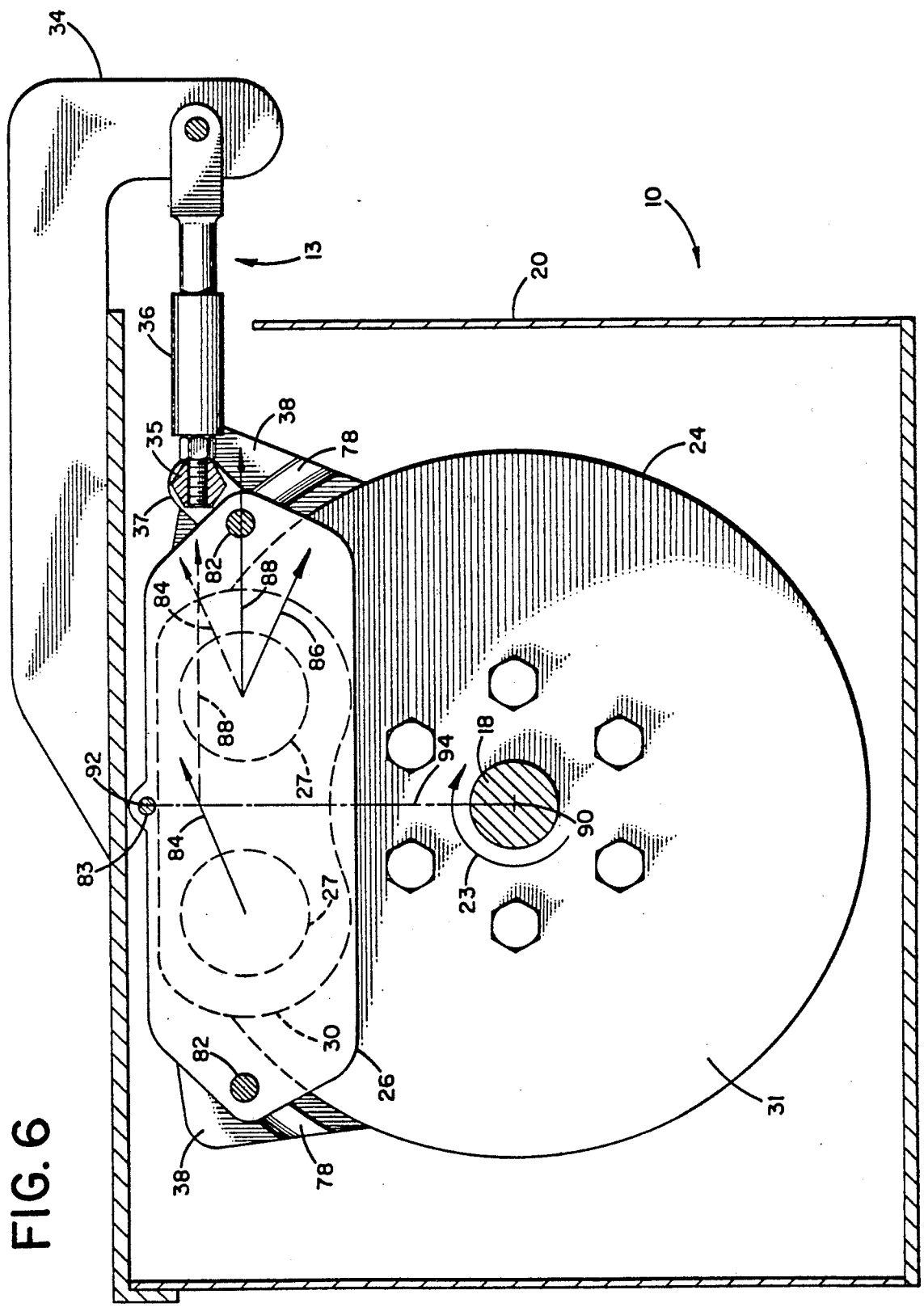
FIG. 6 is a partial cross-sectional view of the present invention similar to FIG. 2 and further illustrating the force vectors associated with the torque measuring apparatus.

As can be seen by a vector analysis presented in FIG. 6, a first force as indicated by the arrow 84, is applied to the first piston pair 27 as they contact the rotating disc 24. The first force 84 applied to the first piston pair 27 extends in a tangential direction to the disc 24 at the point of contact. For clarity, a single force 84 is shown originating from the center of the first piston pair 27 extending tangentically to the disc 24. In reality, the first force 84 is the sum of the forces originating from the incremental point of contact integrated over the surface area of each piston 27 con&:acting the friction material 30. The magnitude of the force 84 is dependent upon a number of factors including amount of force applied to the piston pair 27, and the coefficient of friction between the frictional material 30 and the braking faces 31. The first piston pair 27, naturally applies an equal and opposite force to the rotating disc 24.

A second force 86 is applied to the second piston pair 28 as they contact the rotating disc 24. Similarly, the force 86 applied to the second piston pair 28 extends in a tangential direction to the disc 24 at the point of contact.

Because the pressure applied to the piston pairs 27, 28 is hydraulically controlled, the forces applied by each piston pair 27, 28 are substantially equal in magnitude thereby making forces 84, 86 equal in magnitude. Furthermore, because the piston pairs 27, 28 are positioned symmetrically about center line 94, each force 84, 86 has an equal and opposite radial force whose direction is parallel to center line 94. Referring now to FIGS. 7A, 7B, each force 84, 86 is shown broken down into components which are parallel to the center line 94 (as indicated by the letter "a") or perpendicular to the center line 94 (as indicated by the letter "b").

FIG. 7C illustrates the resultant force 88 which is the sum of the two forces 84, 86. Because forces 84a, 86a are equal and opposite, force 88 has no component in the direction parallel to the center line 94. Thus, force 88 is the sum of forces 84b, 86b and lies in a line perpendicular to the center line 94.

Resultant force 88 is the sum of the two force vectors 84, 86 as shown in FIG. 6. The resultant force 88 is the effective force applied to the caliper 26 and thus the force's measurement directly yields the opposing torque magnitude applied by the braking system 12 to the MEPD.

As was previously mentioned, a strain gauged load cell 36 is coupled to the caliper 26 via coupling arms 37 and a coupling bar 35. The coupling arms 37, which are attached to the caliper 26 by the second caliper pin 82 and bolts (not shown), connect directly to the coupling bar 35. The strain gauged load cell 36 is screwed into a threaded portion of the coupling bar 35 as shown in FIG. 2. The strain gauged load cell 36 is positioned by anchor 34 along the line of the resultant force 88; that is, approximately perpendicular to the center line 94, and detects any strain along this line as shown in FIG. 6. Any movement that the strain gauged load cell 36 detects is transmitted electrically to a receiving unit (not shown) which, in turn, converts the displacement in a torque measurement.

When an opposing torque is applied by the braking system 12, movement of the caliper 26 along the guide grooves 78 occurs in the direction of the resultant force 88. The amount of strain is directly proportional to the amount of force applied by the braking system to the MEPD in the form of opposing torque. The strain gauged load cell 36 measures this strain and, thus, the opposing torque is measured.

In summary, the present invention is designed to overcome the limitations that are associated with prior art dynamometers. It incorporates an internally liquid cooled braking system which can apply a large amount of torque for an extended period of time. This is accomplished by employing a hollowed braking disc comprised of individual cooling cells. The cooling liquid flows by centrifugal force into the cooling cells via a flow tube ring which prevents vapor lock in the system. The vapor escapes the disc via vent holes.

The present invention also incorporates a unique torque measurement system for use with a disc braking system utilizing two pairs of braking pistons. A strain gauged load cell is strategically positioned to measure a resultant displacement of the braking caliper due to the applied torque.

It will thus be seen that the objects set forth above, and those made apparent from the preceding description, are efficiently attained and, since certain changes may be made in the above construction without departing from the scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

Having described the invention, what is claimed is:

1. An internally cooled disc assembly for use in a disc brake assembly, the disc brake assembly having a brake shaft for receipt of rotational energy which is to be retarded by the brake assembly, brake pads for imparting friction against a disc, and means for exerting force to the brake pads, the disc assembly comprising:
  A. a disc having;
    (1) means for mounting to the brake shaft so that rotation of the brake shaft causes rotation of the disc;
    (2) first and second flat surfaces on opposing sides of the disc, each flat surface having a braking face region for frictional contact by at least one brake pad of the disc brake assembly;
    (3) at least one cooling cell formed within the disc, each cooling cell dimensioned for receipt of a cooling liquid so as to remove thermal energy from the disc by heating the liquid to a higher temperature liquid or liquid/vapor state; and
    (4) means communicating with each cooling cell for removing cooling liquid or liquid/vapor from each cooling cell;
  B. means for conveying the cooling liquid to the outer perimeter of each cooling cell so as to prevent a vapor lock condition, said conveying means having first ends each positioned radially inward for receipt of the cooling liquid and second ends each positioned radially outward within a cooling cell so as to discharge the cooling liquid toward the radially extended portion of the cooling cell; and means for supplying cooling liquid to said first ends.

2. An internally cooled disc assembly as defined in claim 1, wherein the braking face regions each extend between an inner radial position and an outer radial position with respect to the disc and further wherein each cooling cell extend between these inner and outer radial positions.

3. An internally cooled disc assembly as defined in claim 2, wherein there is more than one cooling cell, with each cooling cell having a radially disposed partition so as to separate the cell from an adjacent cell.

4. An internally cooled disc assembly as defined in claim 3, wherein each partition has at least one conduit notch formed therein so as to allow cooling liquid/vapor to pass from one cooling cell to an adjacent cooling cell.

5. An internally cooled disc assembly as defined in claim 4, wherein the means for supplying cooling liquid comprises a centrifuge chamber formed within the disc and positioned radially inward with respect to each first end of said conveying means so as to provide cooling liquid thereto.

6. An internally cooled disc assembly as defined in claim 5, wherein the means for supplying cooling liquid further comprises radially extending centrifuge channels each having a first end for receipt of cooling liquid from the centrifuge chamber and a second end so as to provide cooling liquid to each first end of said conveying means.

7. An internally cooled disc assembly as defined in claim 6, wherein the means for supplying the cooling liquid further comprises an annular dispersion channel positioned radially inward from the cooling cells and connected to the second end of each centrifuge channel so as to disperse the cooling liquid from the centrifuge channels to the first ends of said conveying means.

8. An internally cooled disc assembly as defined in claim 1, wherein there is more than one cooling cell, with each cooling cell having a radially disposed partition so as to separate the cell from an adjacent cell.

9. An internally cooled disc assembly as defined in claim 8, wherein each partition has at least one conduit notch formed therein so as to allow cooling liquid/vapor to pass from one cooling cell to an adjacent cooling cell.

10. An internally cooled disc assembly as defined in claim 1, wherein the means for supplying cooling liquid comprises a centrifuge chamber formed within the disc and positioned radially inward with respect to the first ends of said conveying means so as to provide cooling liquid thereto.

11. An internally cooled disc assembly as defined in claim 10, wherein the means for supplying cooling liquid further comprises radially extending centrifuge channels each having a first end for receipt of cooling liquid from the centrifuge chamber and a second end so as to provide cooling liquid to the first ends of said conveying means.

12. An internally cooled disc assembly as defined in claim 11, wherein the means for supplying the cooling liquid further comprises an annular dispersion channel positioned radially inward form the cooling cells and connected to the second end of each centrifuge channel so as to disperse the cooling liquid from the centrifuge channels to the first ends of said conveying means.

13. An internally cooled disc assembly as defined in claim 1, wherein the means for removing cooling liquid/vapor from each cooling cell comprises a plurality of vent holes formed within the disc and positioned radially inward with respect to the disc.

14. An internally cooled disc assembly as defined in claim 13, wherein each of the plurality of vent holes are formed within each cooling cell in a position radially inward in each cell.

15. An internally cooled disc assembly as defined in claim 1, wherein said conveying means comprises a plurality of flow tubes, each flow tube positioned radially outward from the center of said disc.

16. An internally cooled disc assembly as defined in claim 15, wherein the braking face regions each extend between an inner radial position and an outer radial position with respect to the disc and further wherein each cooling cell extend between these inner and outer radial positions.

17. An internally cooled disc assembly as defined in claim 16, wherein there is more than one cooling cell, with each cooling cell having a radially disposed partition so as to separate the cell from an adjacent cell.

18. An internally cooled disc assembly as defined in claim 17, wherein each partition has at least one conduit notch formed therein so as to allow cooling liquid/vapor to pass from one cooling cell to an adjacent cooling cell.

19. An internally cooled disc assembly as defined in claim 18, wherein the means for supplying cooling liquid comprises a centrifuge chamber formed within the disc and positioned radially inward with respect to the first end of each flow tube so as to provide cooling liquid thereto.

20. An internally cooled disc assembly as defined in claim 19, wherein the means for supplying cooling liquid further comprises radially extending centrifuge channels each having a first end for receipt of cooling liquid from the centrifuge chamber and a second end so as to provide cooling liquid to the first end of each flow tube.

21. An internally cooled disc assembly as defined in claim 20, wherein the means for supplying the cooling liquid further comprises an annular dispersion channel positioned radially inward from the cooling cells and connected to the second end of each centrifuge channel so as to disperse the cooling liquid from the centrifuge channels to the first ends of the flow tubes.

22. An internally cooled disc assembly as defined in claim 21, wherein the disc further comprises an internal annular slot and a retaining ring positioned within this annular slot, the retaining ring comprising a plurality of orifices for grasping engagement with the flow tubes so as to maintain the flow tubes within the cooling cells.

23. An internally cooled disc assembly as defined in claim 22, wherein the internal annular slot and the retaining ring positioned within the annular slot are located in the dispersion channel.

24. An internally cooled disc assembly as defined in claim 23, wherein the means for removing cooling liquid/vapor from the cooling cells comprises a plurality of vent holes formed within the disc and positioned radially inward with respect to the disc.

25. An internally cooled disc assembly as defined in claim 24, wherein each of the plurality of vent holes are formed within each of the plurality of cooling cells in a position radially inward in each cell.

26. An internally cooled disc assembly as defined in claim 25, wherein the disc assembly comprises twenty four cooling cells, twenty four flow tubes, and twenty four vent holes.

27. An internally cooled disc assembly 15, wherein the disc further comprises an internal annular slot and a retaining ring positioned within this annular slot, the retaining ring comprising a plurality of orifices for grasping engagement with the flow tubes so as to maintain the flow tubes within each cooling cell.

28. An internally cooled disc assembly for use in a disc brake assembly, the disc brake assembly having a brake shaft for receipt of rotational energy which is to be retarded by the brake assembly, means for retarding the angular rotation of a disc by converting its rotational energy into thermal energy, the disc assembly comprising:
  A. a disc having;
    (1) means for mounting to the brake shaft so that rotation of the brake shaft causes rotation of the disc;
    (2) at least one cooling cell formed within the disc, each cooling cell dimensioned for receipt of a cooling liquid so as to remove thermal energy from the disc by heating the liquid to a higher temperature liquid or liquid/vapor state; and
    (3) means communicating with each cooling cell for removing cooling liquid or liquid/vapor from each cooling cell;
  B. means for conveying the cooling liquid to the outer perimeter of each cooling cell so as to prevent a vapor lock condition, said conveying means having first ends each positioned radially inward for receipt of the cooling liquid and second ends each positioned radially outward within a cooling cell so as to discharge the cooling liquid toward the radially extended portion of the cooling cell; and
  C. means for supplying cooling liquid to said first ends.

29. A device for applying and measuring torque to a rotating disc, comprising:
 (A) at least one pair of opposing friction pads for positionment about the rotating disc so as to frictionally engage the rotating disc and thereby apply a retarding torque to the rotating disc;
 (B) a caliper having means for retaining the friction pad pair about the rotating disc;
 (C) means connected to the friction pads, for frictionally engaging the pads against the rotating disc; and
 (D) a force detector coupled to the caliper so as to be in alignment with the resultant force vector of the friction pad pair;
whereby the force measured by the force detector is a direct measure of the torque applied to the rotating disc by the friction pad pair.

30. A device for measuring and applying torque as defined in claim 29, wherein the means for frictionally engaging the pads against the rotating disc comprises piston pairs, each pair in engagement with one friction pad pair.

31. A device for measuring and applying torque as defined in claim 30, wherein two piston pairs engage one friction pad pair.

32. A device for measuring and applying torque as defined in claim 31, wherein the disc has a center line and the two piston pairs are positioned symmetrically about the center line.

33. A device for measuring and applying torque as defined in claim 32, further comprising a housing, the housing having guides formed therein, and wherein the caliper further comprises pins positioned for movable engagement within these guides.

34. A device for measuring and applying torque as defined in claim 33, wherein the housing includes an arm connected to the detector so as to position the detector in alignment with the resultant force vector of the friction pad pair.

35. A device for measuring and applying torque as defined in claim 34, wherein the force detector is a strain gauged load cell.

36. A device for measuring and applying torque as defined in claim 35, wherein the strain gauged load cell is connected to the caliper.

37. A device for measuring and applying torque as defined in claim 30, wherein the rotating disc is part of
 (A) an internally cooled disc brake assembly, the disc forming part of the disc brake assembly and having;
  (1) means for mounting to a brake shaft so that rotation of the brake shaft causes rotation of the disc,
  (2) first and second flat surfaces on opposing sides of the disc, each flat surface having a braking face region for frictional contact by at least one pad of the disc brake assembly,
  (3) a plurality of cooling cells formed within the disc, each cooling cell dimensioned for receipt of cooling liquid so as to remove thermal energy from the disc by heating the liquid to a higher temperature liquid or liquid/vapor state; and
  (4) means communicating with the cooling cells for removing cooling liquid or liquid/vapor from the cooling cells, the means positioned radially inward with respect to disc;
 (B) means for conveying the cooling liquid to the outer perimeter of each cooling cell to prevent a vapor lock condition, said means having first ends each positioned radially inward for receipt of the cooling liquid and second ends each positioned radially outward within a cooling cell so as to discharge the cooling liquid toward the radially extended portion of the cooling cell; and
 (C) means for supplying cooling liquid to said first ends.

38. The device as defined in claim 37, wherein the braking face regions extend between radial position and an outer radial position and an outer position with respect to the disc and further wherein the cooling cells extend between these inner and outer radial positions.

39. The device as defined in claim 38, wherein each cooling cell has a radially disposed partition so as to separate the cell from an adjacent cell.

40. The device as defined in claim 39, wherein each partition has at least one conduit notch formed therein so as to allow cooling liquid/vapor to pass from one cooling cell to an adjacent cooling cell.

41. The device as defined in claim 40, wherein the means for supplying cooling liquid comprises a centrifuge chamber formed within the disc and positioned radially inward with respect tot he first ends of said conveying means so as to provide cooling liquid thereto.

42. The device as defined in claim 41, wherein the means for supplying cooling liquid further comprises radially extending centrifuge channels each having a first end for receipt of cooling liquid from the centrifuge chamber and a second end so as to provide cooling liquid to the first ends of said conveying means.

43. The device as defined in claim 42, wherein the means for supplying the cooling liquid further comprises an annular dispersion channel positioned radially inward from the cooling cells and connected to the second end of each centrifuge channel so as to disperse the cooling liquid from the centrifuge channels to the first ends of said conveying means.

44. The device as defined in claim 37, wherein each cooling cell has radially disposed partition so as to separate the cell from an adjacent cell.

45. The device as defined in claim 44, wherein each partition has at least one conduit notch formed therein so as to allow cooling liquid/vapor to pass from the cooling cell to an adjacent cooling cell.

46. The device as defined in claim 37, wherein the means for supplying cooling liquid comprises a centrifuge chamber formed within the disc and positioned radially inward with respect to the first ends of said conveying means so as to provide cooling liquid thereto.

47. The device as defined in claim 46, wherein the means for supplying cooling liquid further comprises radially extending centrifuge channels each having a first end for receipt of cooling liquid from the centrifuge chamber and a second end so as to provide cooling liquid to the first end of said conveying means.

48. The device as defined in claim 47, wherein the means for supplying the cooling liquid further comprises an annular dispersion channel positioned radially inward form the cooling cells and connected to the second end of each centrifuge channel so as to disperse the cooling liquid from the centrifuge channels to the first ends of said conveying means.

49. The device as defined in claim 37, wherein the means for removing cooling liquid/vapor from the cooling cells comprises a plurality of vent holes formed within the disc.

50. The device as defined in claim 49, wherein each of the plurality of vent holes are formed within each of the plurality of cooling cells in a position radially inward in each cell.

51. The device as defined in claim 37, wherein said conveying means comprises a plurality of flow tubes, each flow tube being positioned radially outwardly from the center of said disc.

52. The device as defined in claim 51, wherein the braking face regions each extend between an inner radial position and an outer radial position with respect to the disc and further wherein the cooling cells extend between these inner and outer radial positions.

53. The device as defined in claim 52, wherein each cooling cell has a radially disposed partition so as to separate the cell from an adjacent cell.

54. The device as defined in claim 53, wherein each partition has at least one conduit notch formed therein so as to allow cooling liquid/vapor to pass from one cooling cell to an adjacent cooling cell.

55. The device as defined in claim 54, wherein the means for supplying cooling liquid comprises a centrifuge chamber formed within the disc and positioned radially inward with respect to the first end of each flow tube so as to provide cooling liquid thereto.

56. The device as defined in claim 55, wherein the means for supplying cooling liquid further comprises radially extending centrifuge channels each having a first end for receipt of cooling liquid from the centrifuge chamber and a second end so as to provide cooling liquid to the first end of each flow tube.

57. The device as defined in claim 56, wherein the means for supplying the cooling liquid further comprises an annular dispersion channel positioned radially inward from the cooling cells and connected to the second end of each centrifuge channel so as to disperse the cooling liquid from the centrifuge channels to the first ends of the flow tubes.

58. The device as defined in claim 57, wherein the disc further comprises an internal annular slot and a retaining ring positioned within this annular slot, the retaining ring comprising a plurality of orifices for grasping engagement with the flow tubes so as to maintain the flow tubes within the cooling cells.

59. The device as defined in claim 58, wherein the internal annular slot and the retaining ring positioned within the annular slot are located in the dispersion channel.

60. The device as defined in claim 59, wherein the means for removing cooling liquid/vapor from the cooling cells comprises a plurality of vent holes formed within the disc.

61. The device as defined in claim 60, wherein each of the plurality of vent holes are formed within each of the plurality of cooling cells in a position radially inward in each cell.

62. The device as defined in claim 61, wherein the disc assembly comprises twenty four cooling cells, twenty four flow tubes, and twenty four vent holes.

63. A device for measuring and applying torque as defined in claim 29, further comprising a housing, the housing having guides formed therein, and wherein the caliper further comprises pins positioned for movable engagement within these guides.

64. A device for measuring and applying torque as defined in claim 63, wherein the housing includes an arm connected to the detector so as to position the detector in alignment with the resultant force vector of the friction pad pair.

65. A device for measuring and applying torque as defined in claim 64, wherein the force detector is a strain gauged load cell.

66. A device for measuring and applying torque as defined in claim 65, wherein the strain gauged load cell is connected to the caliper.

* * * * *